United States Patent Office 2,940,988
Patented June 14, 1960

2,940,988
STABLE FREE RADICALS

Galvin M. Coppinger, Oakland, Calif., assignor to Shell Oil Company, a corporation of Delaware No Drawing. Filed Nov. 23, 1956, Ser. No. 623,809

6 Claims. (Cl. 260—396)

This invention relates to novel free radicals. More particularly, it relates to novel free radicals which are stable and inert to oxygen.

Heretofore, stable free radicals have been prepared but such free radicals reacted with oxygen thus limiting their utility.

It is an object of this invention to prepare stable free radicals. It is another object of this invention to prepare stable free radicals which are inert to oxygen.

These objects are accomplished by free radicals of the formula

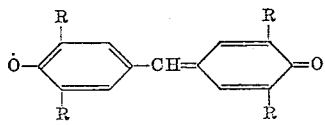

wherein R is a tertiary alkyl group such as dimethyl ethyl carbinyl, diethyl methyl carbinyl, methyl ethyl isopropyl carbinyl, 3-methyl hexyl, and the like. The R's may be the same or different tertiary radicals but it is preferred that they be the same. It is particularly preferred that the R's be tertiary butyl because the starting material is more readily available in that case.

It is an advantage of this invention that the novel stable free radicals are quickly and simply prepared in quantitative yields from starting materials that are readily available. As the starting material any 3,5,3',5'-tetra-tert-alkyl-4,4'-dihydroxy diphenylmethane having the following formula may be used:

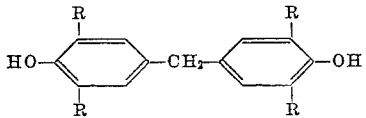

wherein R is a tertiary alkyl radical.

In preparing the novel free radicals of this invention the starting material is merely reacted with an oxidizing agent comprising a compound of lead in the tetravalent state in the presence of a solvent for the starting material. Among the oxidizing agents there may be mentioned lead dioxide, lead tetraacetate, and the like. The reaction proceeds readily at ambient temperatures although higher or lower temperatures may be used if desired. Ordinarily about 1 to 2 hours are required for the reaction to go to completion. After the reaction is complete the products of this invention are produced in substantially quantitative yields. The procedures whereby the products of this invention are produced will be better understood by making reference to the following examples.

Example I

A mole excess of lead dioxide is reacted with 3,5,3',5'-tetra-tert-butyl-4,4'-dihydroxy diphenylmethane in the presence of ethyl ether, isooctane or a similar inert solvent. The reaction is conducted at room temperature and after one hour the lead dioxide is filtered off and the solvent is separated whereupon the product crystallizes. The product is recrystallized from petroleum ether and is found to be present in substantially quantitative amounts. The product has the following configuration:

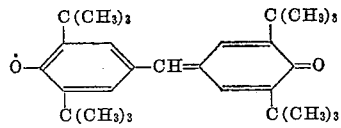

It has a melting point of 153° C. and an analysis of C, 82.8%, H, 9.9%; calculated for $C_{29}H_4O_2$: C, 82.6%, H, 9.7%. The free radical is reduced to the starting material by hydrogen in the presence of platinum. The electron magnetic resonance spectrum is a singlet both in the solid state and in isooctane solution, "g" value of 2. In the solid state the free radical did not react with oxygen after 3 months and in solution of isooctane it did not react with oxygen for 3 days. The infrared spectrum indicates that no —OH stretching band is present and the only absorption between 3.5 and $6.4\mu$ is an intense band at $6.35\mu$. Absorption in the ultraviolet indicates that the free radical obeys Beer's law. The free radical is reduced to (3,5-di-tert-butyl-4,1-benzoquinone)-1-(3',5'-di-tert-butyl-4'-hydroxyphenyl) methide,

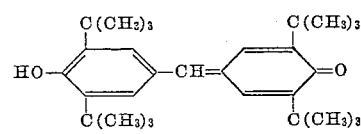

with hydroquinone in ether and has a melting point of 157–8° C. and has a calculated analysis for $C_{29}H_{42}O_2$ as follows: C, 82.6%, H, 10%; found C, 82.4%, H, 10%. When the methide is treated with lead dioxide in ether the free radical is obtained. When the free radical is treated in methanol with a trace of toluene sulfonic acid a mixture of 3,5,3',5'-tetra-tert-butyl-4,4' - dihydroxydiphenylmethyl ether and 3,5,3',5'-tetra-tert-butyl-4,4'-diphenoquinone is obtained.

Example II

The procedure of Example I is repeated except that lead tetraacetate is used as the oxidizing agent. Substantially the same results are obtained.

In a similar manner other free radicals may be obtained in which different tertiary alkyl groups appear at the 3,5,3',5'-positions.

The free radicals of this invention are useful as standards for electron magnetic resonance measurements. Thus, to determine the amount of free radicals in a test sample, apparatus for measuring electron magnetic resonance is standardized with the free radicals of this invention. Thereafter, the electron magnetic resonance of the test sample is measured on the previously calibrated measuring apparatus. It will be appreciated that because the free radicals of this invention are stable and inert to oxygen electron magnetic resonance measurements can now be made with a degree of accuracy which heretofore has not been possible. The free radicals of this invention may also be used as starting materials for the preparation of tetra-tert-alkyl quinone methides and ethers of the type described above which are useful as antioxidants.

I claim as my invention:

1. Stable free radicals of the formula

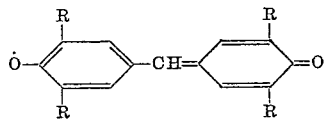

wherein the R's are tertiary alkyl radicals having up to seven carbon atoms.

2. The stable free radical

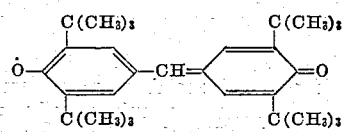

3. The process for the preparation of the stable free radicals of claim 1 which comprises reacting in liquid phase 3,5,3',5'-tetra-tert-alkyl-4,4'-dihydroxy diphenylmethane in the presence of an oxidizing agent selected from the group consisting of lead dioxide and lead tetraacetate.

4. The process of claim 3 in which the alkyl radicals are tert-butyl.

5. The process of claim 3 in which the oxidizing agent is lead dioxide.

6. The process of claim 3 in which the reaction is conducted at ambient temperatures in the presence of an inert organic solvent.

References Cited in the file of this patent
UNITED STATES PATENTS

| | | |
|---|---|---|
| 2,785,188 | Coe | Mar. 12, 1957 |
| 2,794,051 | Lipscomb | May 28, 1957 |

OTHER REFERENCES

Cook et al., J.A.C.S., vol. 75, pp. 6242–44 (1953).
Kharasch et al. J. Org. Chem., vol. 22, pp. 1439–43 (1957).
Cook, J. Org. Chem., vol. 18, pp. 261–6 (1953).